US009560242B2

(12) United States Patent
Hill et al.

(10) Patent No.: US 9,560,242 B2
(45) Date of Patent: Jan. 31, 2017

(54) METHOD AND DEVICE FOR THE TRUE-TO-ORIGINAL REPRESENTATION OF COLORS ON SCREENS

(75) Inventors: Bernhard Hill, Aachen (DE); Ronald Post, Bonn (DE); Stephan Helling, Aachen (DE); Arndt Glowinski, Aachen (DE)

(73) Assignee: CADDON COLOR TECHNOLOGY GMBH (DE)

( * ) Notice: Subject to any disclaimer, the term of this patent is extended or adjusted under 35 U.S.C. 154(b) by 84 days.

(21) Appl. No.: 12/989,702

(22) PCT Filed: Jun. 16, 2009

(86) PCT No.: PCT/IB2009/005959
§ 371 (c)(1),
(2), (4) Date: Apr. 22, 2011

(87) PCT Pub. No.: WO2009/133471
PCT Pub. Date: Nov. 5, 2009

(65) Prior Publication Data
US 2011/0205253 A1    Aug. 25, 2011

(30) Foreign Application Priority Data
Apr. 28, 2008 (DE) .......... 10 2008 021 148

(51) Int. Cl.
*G09G 5/10* (2006.01)
*H04N 1/60* (2006.01)
(Continued)

(52) U.S. Cl.
CPC .............. *H04N 1/6011* (2013.01); *G01J 3/46* (2013.01); *G01J 3/462* (2013.01); *G01J 3/463* (2013.01);
(Continued)

(58) Field of Classification Search
CPC ................ G09G 3/2003; G09G 3/3406; G09G 2300/0452; G09G 2320/0276; G09G 2320/0626; G09G 2320/0666; G09G 2360/145; G09G 2360/16; G01J 3/46; G01J 3/465; G01J 3/506
(Continued)

(56) References Cited

U.S. PATENT DOCUMENTS 4,106,846 A * 8/1978 Russin .......................... 348/179
5,319,472 A   6/1994 Hill et al. ..................... 358/500
(Continued)

FOREIGN PATENT DOCUMENTS

DE    4119489    11/1991   ............. H04N 1/401
DE    4235005    4/1993    ............... G06F 1/06
(Continued)

OTHER PUBLICATIONS

International Search Report (w/translation) issued in application No. PCT/IB2009/005959, dated Jun. 9, 2010 (12 pgs).
(Continued)

Primary Examiner — Joe H Cheng
(74) Attorney, Agent, or Firm — Hayes Soloway P.C.

(57) ABSTRACT

Described is a method and a device for screen calibration for the true-to-original reproduction of surface colors, the spectral reflection distribution of which is known, wherein by setting parameters the screen can be influenced using software and an electronic controller in each partial region of the screen. The disclosure is characterized in that an observer adapts the reproduced color impression of the screen to the color impression of an original in each partial region of the screen, wherein the original is compared to the screen colors immediately thereafter on the screen surface and the screen parameters are varied until the color impressions of the original and of the screen appear identical to the observer on
(Continued)

Figure 1A:
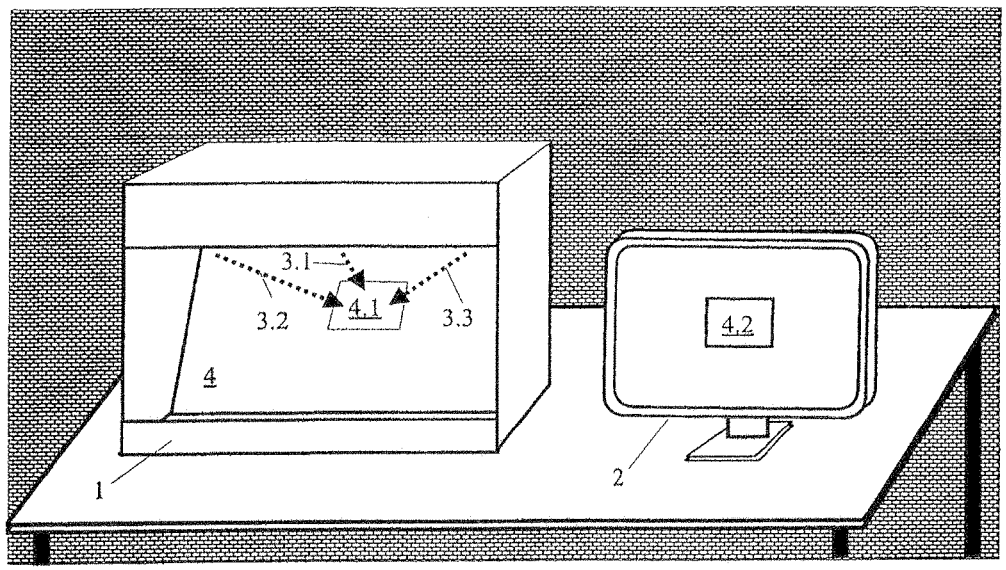

the respectively viewed partial screen, viewed from a predefined observer angle, and the settings performed are stored in a screen profile.

12 Claims, 7 Drawing Sheets

(51) Int. Cl.
  *G01J 3/46* (2006.01)
  *G01J 3/50* (2006.01)
  *G01J 3/51* (2006.01)
(52) U.S. Cl.
  CPC .............. *G01J 3/465* (2013.01); *G01J 3/50* (2013.01); *G01J 3/506* (2013.01); *G01J 3/51* (2013.01)
(58) Field of Classification Search
  USPC ........ 345/43, 72, 83, 88, 593, 690; 348/179; 356/402, 408, 425, 448
  See application file for complete search history.

(56) References Cited

U.S. PATENT DOCUMENTS

| | | | |
|---|---|---|---|
| 5,630,146 A | 5/1997 | Conary et al. ................ 395/750 |
| 5,634,117 A | 5/1997 | Conary et al. ................ 395/556 |
| 5,638,117 A * | 6/1997 | Engeldrum et al. .......... 348/179 |
| 5,670,985 A * | 9/1997 | Cappels, Sr. ....... G06F 3/04897 345/207 |
| 6,036,317 A | 3/2000 | Seegers et al. ............... 351/243 |
| 6,816,145 B1 * | 11/2004 | Evanicky ............. G02B 6/0043 345/102 |
| 6,961,461 B2 * | 11/2005 | MacKinnon et al. ........ 382/164 |
| 7,487,118 B2 * | 2/2009 | Crutchfield, Jr. ...... G06Q 20/20 345/581 |
| 7,623,105 B2 * | 11/2009 | Li et al. ........................... 345/88 |
| 7,710,433 B2 * | 5/2010 | Holub ........................... 345/589 |
| 7,876,441 B2 | 1/2011 | Fejfar ........................... 356/402 |
| 8,228,340 B2 * | 7/2012 | Jang ........................ H04N 9/68 345/581 |
| 2002/0075288 A1 * | 6/2002 | Matsumura et al. ......... 345/690 |
| 2003/0020703 A1 * | 1/2003 | Holub ........................... 345/207 |
| 2005/0157298 A1 * | 7/2005 | Evanicky et al. ............. 356/416 |
| 2006/0280360 A1 * | 12/2006 | Holub ........................... 382/162 |
| 2007/0146266 A1 * | 6/2007 | Yasuda et al. .................. 345/88 |
| 2007/0279390 A1 * | 12/2007 | Loukianov .................... 345/169 |
| 2008/0062419 A1 * | 3/2008 | Fejfar ........................... 356/394 |
| 2010/0157154 A1 * | 6/2010 | Kobayashi et al. .......... 348/557 |
| 2011/0096103 A1 * | 4/2011 | Kato ............................. 345/690 |
| 2011/0205253 A1 | 8/2011 | Hill et al. ..................... 345/690 |

FOREIGN PATENT DOCUMENTS

| | | | |
|---|---|---|---|
| DE | 10121984 | 11/2002 | ............... H04N 1/60 |
| DE | 102005028487 | 12/2006 | ............... G09G 3/00 |
| DE | 102008021148 | 10/2009 | ............... H04N 1/60 |
| EP | 0928956 | 6/2000 | ............... G01J 3/51 |
| EP | 1889721 | 2/2008 | ............... B41F 33/00 |
| WO | WO9531067 | 11/1995 | ............... H04N 5/58 |
| WO | WO0128231 | 4/2001 | ............... H04N 1/60 |
| WO | WO2005052673 | 6/2005 | |

OTHER PUBLICATIONS

PCT Written Opinion (w/translation) issued in application No. PCT/IB2009/005959, dated Jun. 9, 2010 (30 pgs).
International Preliminary Report (w/translation) on Patentability issued in application No. PCT/IB2009/005959, dated Nov. 23, 2010 (13 pgs).
http://www.color.org website, p. 1, downloaded Dec. 31, 2015.
Chinese Office Action (w/translation) issued in application No. 200980125565.X, dated Jan. 15, 2014 (16 pgs).
Chinese Office Action (w/translation) issued in application No. 200980125565.X, dated Jul. 10, 2014 (8 pgs).
Fairchild, M.D., "Color Appearance Models," 1998, synopsis only (3 pgs).
CIE publication, "Colour Appearance Model for Colour Management Systems: CIECAM02," 159:2004, abstract only (1 pg).
Wyszecki et al., "Color Science: Concepts and Methods, Quantitative Data and Formulae; 2nd Edition," Aug. 2000, book description only (2 pgs).
Vienot, F., "Report on a fundamental chromaticity diagram with physiologically significant axes," 9*th* Congress of the International Colour Association, Proceedings of SPIE, vol. 4421, 2002 (6 pgs).
German Office Action (translation only) issued in application No. 10 2008 021 148.6, dated Mar. 16, 2012 (8 pages).

* cited by examiner

METHOD AND DEVICE FOR THE TRUE-TO-ORIGINAL REPRESENTATION OF COLORS ON SCREENS

1. BACKGROUND OF THE INVENTION AND STATE OF THE ART

The invention refers to a method and a device for the true-to-original reproduction of colors and colored pictures on a screen in direct comparison to a physical color with a physical color sensor (=Softproof).

Known and customary methods and devices for comparing colors that are either available as physical models and are also reproduced on a screen, use, for example, a tube screen or an LCD screen which is mounted adjacent to an observation box (also called light box) with a surface arranged in an angle under defined illumination. An example of such a model is outlined in FIGS. 1a and 1b. An observation box 1 sits next to a monitor or screen 2. In box 1 a light source consisting of several fluorescent tubes LI-L3 is positioned diagonally across an observation surface 4. These light sources L1-L3 sends illumination or light 3 consisting of directly entering light rays 3.1 and indirect light through reflecting light rays 3.2, 3.3 onto an observation surface 4. An original color sensor 4.1 is located on the observation surface 4 in box 1, its color reproduction 4.2 appears on screen 2. Such color-matching locations are generally known and correspond to products on the market by various suppliers.

An original color sensor 4.1 to be compared will be measured for an electronic reproduction with a colorimeter or is taken with a color scanner for an entire color picture, and its color values will be reproduced on a screen as image in electronic form.

Color values as measure of colors are standardized in technology through the CIE1931 2-degree standard observer or the CIE1964 10-degree observer. The measuring technique to measure color values is described in DIN 5033 or for the graphics industry in Standard ISO 13655. Normal colorimeters supply color values either as standardized CIE1931 XYZ values (integral colorimeter), or they measure the spectral reflectance $\beta(\lambda)$ of the color sensor (spectrophotometer). In the latter case, and with their help and with the spectral value curves $x(\lambda)$, $y(\lambda)$ and $z(\lambda)$ defined by the standard observer, the standard color value X, Y and Z can be calculated:

$$X = k \int_{380nm}^{780nm} S_\lambda \beta(\lambda) x(\lambda) d\lambda, \quad Y = k \int_{380nm}^{780nm} S_\lambda \beta(\lambda) y(\lambda) d\lambda, \quad \text{Gl. 1}$$
$$Z = k \int_{380nm}^{780nm} S_\lambda \beta(\lambda) z(\lambda) d\lambda.$$

The color values are always defined as relative variable and k is a standard constant. For a precise calculation of the color values of a color sensor, it is necessary to work with the spectral distributions of the reflection of the sensor and the light. That requires that the spectral distribution $S\lambda$ of the rays impinging the sensor through illumination 3 in the box is known. Therefore, this must be measured very precisely.

The fractions of the light reflected by the sensor form the so-called color stimulus and are described by the product through spectral distribution of the illumination of the sensor and the reflection of the sensor and are called spectral color stimulus, $\phi(\lambda) = S_\lambda \beta(\lambda)$. The spectral color stimulus reflected from the sensor will be taken in by the eye of an observer and impinged on the retina of the eye where it triggers the color perception of the observer. To ascertain the standard color values, all spectral fractions are integrated through the wavelength of 380 through 780 nm visible to the human eye. The value k in G1.1 is a standardizing constant which is usually determined through the Y value of a white color sensor under the same lighting as the lightest color directly from the color value Y of the light source:

$$k = 1,0 \bigg/ \int_{380nm}^{780nm} S_\lambda \beta_{wei\beta}(\lambda) y(\lambda) d\lambda \, oder \, \dot{\iota} = \int_{380nm}^{780nm} S_\lambda y(\lambda) d\lambda \quad \text{Gl. 2}$$

The color values are related variables and differ from absolute variables which are described for example in light flow or light intensity and determine the absolute brightness of a color.

For the reproduction of a color on screen 2 the starting point is the color value according to Gl. 1. The screen must be calibrated for a precise color reproduction, so that an entered color value from the technical point of view of measuring can be reproduced with the same color values on the screen. For that purpose the methods known today of the so-called "Color Managements" are being applied. The method for the reproduction of the color value on a screen has been standardized by the "International Color Consortium" (ICC) and can be viewed on the internet.

If the measured and color values reproduced under illumination in the observation box correspond metrologically with the colors that are reproduced on the screen, then a visual conformity of the two colors are expected for an observer.

So far in practice, a look-alike reproduction of an original, that is an original physical color sensor, has been only inadequately achieved. According to the Inventor's experience, there are several reasons that are listed hereinafter.

1.1 Distribution of Spectral Lighting Depending on Location

One of the first reasons for oftentimes not conforming colors is that the colorimeters used to determine the spectral reflection of a color use a specific lighting geometry as also defined in DIN 5033. This may be also a lighting directed under 45 degrees (so-called 45/0 geometry) when an observer looks perpendicular onto the sensor. Also a 0/45 Grad geometry is used, when the sensor is perpendicularly illuminated and the observer looks at the model in a 45 degree angle or a diffuse light measure with an Ulbrichtkugel (integrating sphere). A defined lighting geometry as in a colorimeter cannot be precisely reproduced in the normal light boxes. In most instances, a light source is being realized through several fluorescent tubes in the upper region of a box, in order to illuminate a sensor. To increase the homogeneity of the illumination, boxes are also known that use another fluorescent tube in the lower region of the box.

The light impinging directly from the light source on the sensor should also possess a constant spectral distribution on the observer surface, because taking into consideration a spectral distribution dependent on location when calculating the color would be very expensive. However, as a result of the reflection from the walls of the box, additionally reflected light (3.2, 3.3 in FIG. 1 b) is directed onto the sensor, which is converted through the spectral reflection properties of the walls into another spectral dispersion than the one of the direct ray 3.1. This superimposes with locally different dispersion on the direct light, e.g. near the walls, with stronger influence than in the center of the picture. Moreover, oftentimes also reflectors R1-R3 are mounted behind the fluorescent tubes, in order to guide additional light on the sensor. This measure also leads to locally different spectral fractions through the wavelength-dependent reflections of the reflectors. The illumination 3 of the sensor is thus neither fully spectrally homogenous nor has there been a reproduction of a clearly defined lighting geometry as in a measuring device.

In order to improve the distribution of brightness in the sensor area, scatter plates P are placed in front of the light sources. They are made of plastic with specific corrugation. As a result of the wavelength-dependent light refraction on plastic, an angle-dependent spectral distribution of the light-rays allowed to penetrate can be anticipated.

1.2. Effect of Interior Lighting

When color matching in practice, it is desirable to set up the observation box and the monitor in a dark room. For industrial use, usually an interior lighting is provided that makes it possible to work next to the color matching devices. However, in that instance, interior light falls also into the observation box and illuminates also the monitor surface positioned next to it. This changes in the box the perception of the original colors. In order to keep the external light fraction small, the observation box is oftentimes set up with a very large depth. The disadvantage thereof is that as a result a "cave-like" observation impression is created.

The light reflected additionally through the reflection of the screen surface because of the internal light produces a reduction of the picture contrast. Moreover, it must be noted that the spectral composition of the interior lighting is not taken into account thus far to calculate the reproducing color.

1.3 Lacking Uniformity of Illumination

Because the areas of the supporting surface of the color sensors in the observation box, in particular in perpendicular direction, are located at varying distances from the light source, the illumination strength on the supporting surface changes according to the location. On the other hand, the distribution of the luminance on a screen is not totally constant and changes according to location. Typically, differences in illumination in the observation box can occur in the range from 10% to 20%. Also with respect to screens, the typical differences of luminance from the center of the screen to the screen frame range in this area, however, their distribution differs from the distribution in the observation box. As already mentioned under 1.1., light scatter plates P are installed in the light path to improve the uniformity and moreover, an observation box is offered which uses an additional light source in the floor area to reduce the decline of the luminance in perpendicular direction. Various companies offer procedures for screens, in order to homogenize the luminance across the screen. These method effect a reduction of the difference. However, practice has shown that there are still visible differences in brightness between the colors of the originals in the observation box and the reproduction on the screen, because it can't be accomplished to exactly conform luminance distribution of the screen to the illuminance.

1.4 Environment and Color Appearance

Another problem, why in most instances no identical appearing colors can be accomplished, results from the effects of the color appearance. The visual perception of a color by a human observer depends on the distribution of colors in the direct environment of an observed sensor and on the illumination in the broader environment of a scene. Hence, the perception of brightness of a color changes drastically with the brightness of the environment and the perception of the hue shifts with the color of the environment into the direction of the complementary colors. These effects of the so-called color appearance are expressly described, e.g. in [1,2]. The shifts in the perception of color in the environment can somehow be described with the help of models. One of these models for example had been prepared and described in one working group of the International Commission on Illumination, CIE, in report CIE-159-2004. The so-called ocular adaptation level is important to the appearance of a color. Parameters that control the visual appearance of a color in the brain of a human depend on the brightness and the distribution of the colors in the field of vision and the visual system of the human gets used to it within about 2 minutes and adapts to same.

Figure 1B:
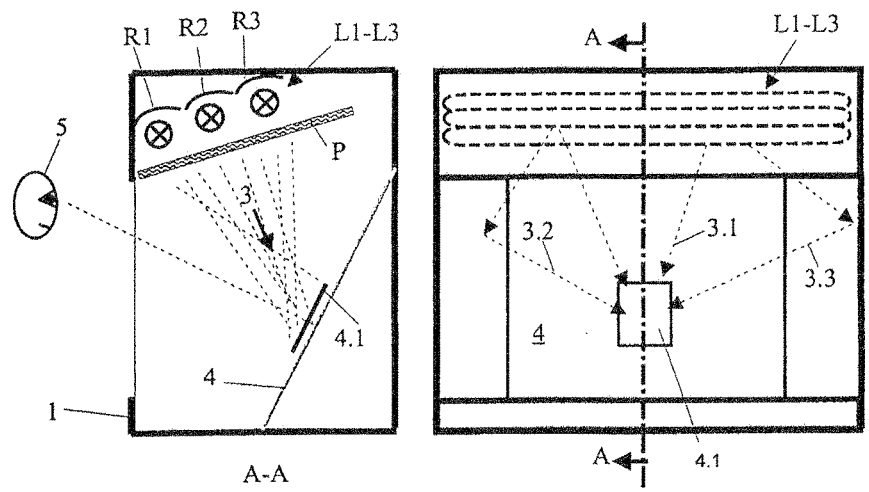

The effects of the color perception in the color matching arrangement of FIGS. 1a and 1b now effect that the colors in the original model appear differently under the illumination of the observer box in the field of view of an observer than what occurs after a shift of the observer direction on the screen with a different environment. The state of adaptation of the eye changes, if the observer looks into one direction for a longer period of time. Because the totality of all colors and brightness of the illumination in the field of vision of the observer during looking back and forth in comparison normally do not correspond, the colors on the monitor next to the box appear differently than the original colors in the observer box. Usually, when setting up the monitor, at least an environmental brightness is provided which corresponds to about 20% of the brightness of the maximum white level in the reproduction of the picture. However, in the observer box the direct environment of a color model is illuminated with the same brightness as the sensor itself.

In using a color appearance model such as known for example from CIE159-2004, an attempt can be made to compensate these differences through a predistortion of the electronically reproduced colors, however, practical experience shows that the methods available are not sufficient to achieve a precise conformity of all colors through refraction. In addition, the illumination of the environment and of the background locally fluctuates strongly and a measuring technique can only detect same with difficulty and, thus, they cannot be precisely taken into account.

1.5 Precision of Color Comparison

It must be further noted that because of the spatially separated arrangement of original and reproduced colors, a comparison of conformity is only approximately possible, because during a fast change in observation of original and reproduction, the color comparison is only approximately possible through the power of color memory of the observer. In practice, color differences during this type of comparison can only be recognized up to differences of CIE $\Delta E2000=2$ to 4 (CIE $\Delta E2000$ is the measure for color differences recommended by CIE). This precision is not sufficient for many applications.

Today the goal it to transmit worldwide color pictures and color sensors electronically and for professional applications and to work on design methods on the monitor. A comparison of the results of such processes is only possible, if it has been assured that on each respective monitor an original color sensor can be precisely defined, that is, up to color differences of less than $\Delta E2000<1.0$. Even color differences of less than $\Delta E2000=1$ are then still clearly visible, if they adjoin, which can occur frequently in practice during joining of color surfaces, e.g. then, when partial products from different product lines shall be joined together.

1.6 Observer Properties

A color comparison of original and reproduced colors oftentimes leads also to different impressions, when the spectral sensitivity curve of the type of the retinal cones of the human observer systemically deviates from those defined by standard observes according to CIE. In practice, the differences between various observers and the defined standard observer are more the rule. Moreover, the spectral color-matching curve effective for the color vision of a human eye changes with increasing age. Because the density of the retinal cone also decreases at different strength from the center [fovea-Translator] of the highest density, the color signals transmitted to the brain change with covered color surface. They are described in technology by the so-called observation angle, under which a color surface is reproduced in the eye. For that purpose 2° and 10° were selected for the standard observer.

For technical color reproduction a decision must be made for one of these two observers. For large-area color sensors the 10°-observer is used, for small-area color surfaces, the 2°-observer is used. This does not allow an exact accounting of all possible observer angles.

In principle, an adaptation for each individual observer is possible, even in dependence on age. However, a reproduction can then only be optimized for that one observer.

Patent application DE 101 21 984.9, "Methods and Devices for visually optimized representation of color pictures on monitors and/or their comparison with originals or printed pictures" is a first step disclosed, to solve the above-mentioned problems. The recommendation is outlined in FIG. 2. This recommendation suggests the use of one single box 1, which combines the observation surface 4 of the original and the monitor 2. It is recommended hereby, to arrange the observation surface 4 for one original color sensor 4.1 together with the surface of a monitor 2.2 and the color reproduction 4.2 reproduced thereon on one level and to make the colored environment for both alike. Thus, on observation level 4, an observation area 2.1 identical with the monitor surface is defined. It is also recommended to arrange a white frame 4.3 around the observation sensors or the monitor and to create around it a neutral grey environment surface. The entire surface will be illuminated as much as possible with one or several rod-shaped light sources L1. The light 3 strikes at almost 45 degrees onto the observation and monitor surface and it is assumed that an observer looks almost perpendicularly at the color mode and the monitor, that is, at an angle of $\alpha=45$ degrees to the illumination. Thus, two of the above mentioned problem items under 1.1 and 1.4 are solved: The geometry of the illumination is designed as almost 45/0 degree geometry and the original color sensor and the reproduced color on the monitor are arranged in the same environment under same illumination and thus result in the same color appearance.

In patent application DE 101 21 984.9 it is also recommended to adapt the brightness of a white color, a reference white, exactly to the brightness of each original color sensor and the reproduction under joined illumination. The white frame around the observation surface and around the screen serves to stabilize the adaption state of the eye.

2. PURPOSE OF THE INVENTION AND SUMMARY OF THE INVENTION RECOMMENDATION

The object of the invention consists of recommending solutions, to avoid the problems mentioned under 1.1 through 1.5, and to insure a reproduction of color on the monitor guarantied to be visually the same for the observer compared to the original colors under a defined illumination.

This object is resolved through the characteristics of the independent patent claims. Advantageous continued developments of the inventions are the subject of subclaims.

In accordance with the invention, a method for the calibration of screens is recommended. For that purpose, a screen is arranged on a color-neutral surface, which surface is being illuminated under almost 45 degrees by a preferably rod-shaped light source and original color sensors are arranged on the screen surface, so that the reproduced colors on the screen in direct comparison next to or adjacent to the original colors will result in an identical color perception by an observer. Thus, it will be achieved that the exact spectral light distribution will be measured at the location of the color sensor and thus the original color values will be calculated and reproduced on the screen taking into account the measured light distribution, at the same time the main light source as well as the additional external light impinging from the outside with its respective spectral distribution will be taken into account. Moreover, for the color calculation, variable basic color-matching curves can be used by observers, that on the one hand are better adapted to the human user than the ones from the standard observer, and on the other hand, are being made dependent on the middle observed color surface size, respectively the allocated observer angle, whereby also the screen calibration will be calculated variably in dependence on the respectively used basic color-matching curves.

According to the invention it is also recommended for the improvement of the uniformity of the illumination on the screen surface to arrange mechanical masks in the light path which in specifically calculated forms locally block the light or let it pass through from one or more light sources.

For the methods to softproof customary today, it is being attempted to design or correct respectively the light distribution on the observation surface of the original and the distribution of the luminance on the screen so that best possible uniformity can be achieved. However, in practical application, large technical difficulties are encountered and uniformity in the area of 1% of the average brightness will not be achieved. However, in order to accomplish invisible differences between the reproduction and the original color a precision of 1% is required.

Contrary thereto, the recommended invention adapts now the screen brightness exactly to an existing localized illumination and thus a high precision of directly adjacent to one another original colors and their reproduction of over 1% of brightness difference will be accomplished, while across the entire screen area local brightness differences of over 1% are admitted.

Moreover, according to the invention, a method is suggested to reproduce a color impression of an original to a remote observer through a color reproduction on a screen, while:

From the original, taking into account given lighting conditions, an object-specific spectral reflection distribution will be defined, the object-specific spectral reflection distribution will be transmitted to the remote observer, and taking into account a given screen profile, given lighting conditions on a screen and a given spectral sensitivity profile of the remote observer, the color impression of the original is being reproduced on this screen for the observer under the given light conditions on the screen.

Furthermore, the inventors suggest also a device for the reproduction of a color impression of an original for a remote observer having a screen for the reproduction of color, a computer with software to control the screen and a lighting device for the defined illumination of the environment of the screen having the following characteristics:

the screen is set up in a box or a room, the illumination is executed through extended rod-shaped light sources that are mounted above or below the screen, so that the horizontal screen center is illuminated in a 45 degree perpendicular section, and homogenization of the lighting distribution on the screen can be accomplished in that partial light covers (=light masks) in the light path of the light from the light sources to the screen are arranged, which, because of their form, block or let pass through fractions of the light rays from the light sources on the path to the screen depending on location and/or angle.

3. SPECIAL EMBODIMENT OF THE IDEA OF THE INVENTION AND EXAMPLES

The invention is explained in more detail in the following with the help of FIGS. 3 through 5. For the explanation, color values are described with the help of examples through XYZ values and basic color-matching curves through $x(\lambda)$, $y(\lambda)$ and $z(\lambda)$, that are not necessarily conforming to the standard color values respectively the standard color-matching curves. This does not imply a limitation, because color values respectively basic color-matching curves can be reproduced according to the law of colorimetry through any kind of linear combinations of color-mixing curves that were ascertained for a human observer.

The invention further assumes that all original colors to be reproduced are described through their spectral reflection properties. Those can be measured with commercial spectrophotometers, if homogenous color surfaces are present. For the pictures it is assumed that multi-spectral picture photos are available, for which for each pixel there is a description of the spectrum of the reflection of recorded models.

Figure 3:
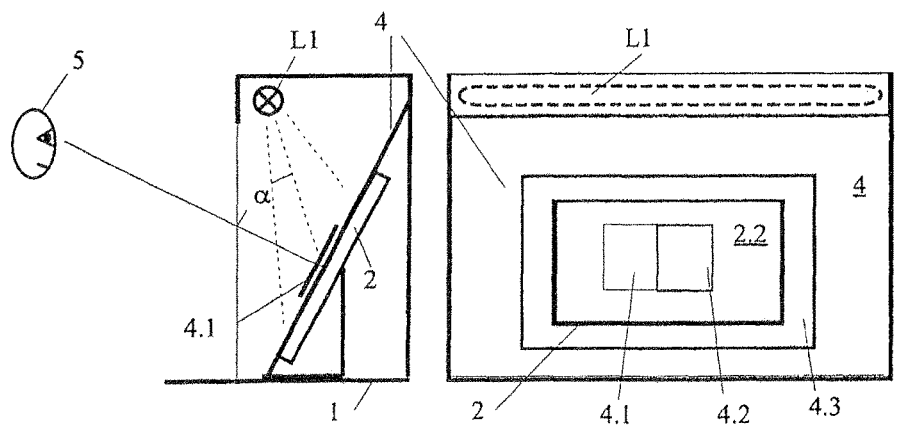

FIG. 3 represents a possible basic structure for the color reproduction and the illumination of the comparison model according to the idea of the invention. It is the object of the invention to allow an absolute reliable and at any time controllable color reproduction on a screen in relation to the original surface colors under a defined and spectral clearly described light source. For that purpose an observation surface 4 is arranged in an observation box, in which observation surface screen 2 is fitted with its surface 2.2. The observation surface 4 will be illuminated with a preferably rod-shaped light source LI. The length of this light source LI covers up the entire width of the observation box 1 and is purposefully selected longer than the screen width, so that in the area of the screen in horizontal direction a illuminance as uniform as possible can be accomplished. The inclination of the observation surface 4 has been selected so that the direct rays of the light source imping on the picture center at an angle of close to 45 degrees. It is further assumed that under normal observation conditions, an observer 5 looks perpendicularly to the picture center. This illumination approaches then the defined standard under measuring of colors according to DIN 5033 under the illumination angle of 45° and the observation angle of 0 degree (45/0 degree).

Alternatively, the invention can also be executed with a plane-like extended light source—this can be either one or few plane-like formed executed light sources or on the other hand, a number of dot-liked formed and plane-wide distributed light sources. However, then it must be noted that the measurement of the original colors should have a measuring geometry, which uses the same geometry of the entering light rays as they are produced relative to the observations surface, because otherwise a color-equal reproduction is hardly possible. The use of LED lighting can also be applied, which offers the additional advantage, that the uniformity of the local distribution of the illumination through targeted control of the brightness of the LED lighting can be improved.

The active surface 2.2 of the screen will, as example, in the area of the illumination be surrounded with a color-uniform surface 4. Alternatively, a white frame can be arranged around the screen, as described and substantiated in patent application DE 101 21 984.9. In the extended environment it makes sense to provide a shade of grey for a spectral, as far as possible independent, neutral reflection of about 20%. With respect to this reflection of 20%, the observer perceives a brightness of about 50% from a white surface with the reflection of close to 100%, thus this corresponds to an average screen brightness in the environment.

The white frame 4.3 has proven to be effective because it stabilizes the adaption condition of the eye and thus the color perception of a picture reproduction and defines with its color values Xw, Yw and Zw (the index w means white) under illumination of a type of reference light. The frame should, as far a possible, be coated with a white and matt surface of almost constant spectral reflection in the visible area, and it should not contain any optical brightener.

For a color comparison, an original sensor 4.15 can be positioned either in the direct environment of the screen or on the screen. The latter allows a better color comparison, if a reproduction 4.2 of the color on the screen directly borders the original model.

First of all, for the reproduction the color values of a sensor must be determined. For that purpose, the spectral light distribution $S\lambda$ must be measured at the location of the sensor with a spectroradiometer. For color distributions in pictures it is recommended to use the multi-spectral technology described in patent DE 41 19 489 C2, in order to ascertain for each pixel of a picture the reflection distribution $\beta(\lambda)$. With the help of G1.1, the color values XYZ respectively the color stimuli reflected into the direction of the observer can be calculated.

The color values thusly obtained of the picture of color sensor 4.1 will be electronically reproduced over the screen with the help of the known procedure for the control of screens in such manner that the same color values XYZ will appear in color field 4.2. If this is the case, taking into account the color-metric properties of the observer with sufficient precision, then the electronically reproduced color in the observation device will be perceived by an observer just as the original model which directly borders the field of the reproduced color.

However, initially the color values of the sensor are known only as relative values and it must still be ascertained with what absolute brightness they must be reproduced on screen 2. For that purpose, a visual comparison method of the invention must be used, with which the brightness profile will be ascertained. According to FIGS. 4a and 4b for that purpose, a mask 6 is mounted in front of the screen, which contains a number of regularly arranged windows with center points 6.2. The center points of the window form a uniform grid over the screen. Behind each window there is respectively mounted a physical test-color surface 4.1, e.g. a homogenous printed paper sensor which, for example, covers respectively the upper half of a window. The lower half is open and behind this opening, colors 4.2 will be reproduced via the screen. The reproduced colors thus border directly on their originals and can be compared as best as possible.

According to the invention, software is used to ascertain the brightness profile with which software the brightness of each reproduced color can be adjusted individually in a window. This adjustment is made, for example, manually via a separate screen menu of a computer (not shown), which controls screen 2 for the color representation. The light distribution 4.1.1 of the original color 4.1 reflected from each test color and the spatially directly connected light distribution 4.2.1 of the screen lead to color stimuli, that can be best possibly compared in the eye of the observer in front of the screen with the highest sensitivity. Therefore, visually a sensitive adjustment of the brightness in each window is possible. The brightness values in the screen center of each window will be stored upon successful adjustment as grid over the screen surface. A subsequent two-dimensional interpolation realizes a brightness profile via the screen, which will be taken into account as local reference in the colors to be reproduced and thus guaranties an exact reproduction also of absolute brightness of the color in each pixel. This assumes that the brightness on the screen changes only steadily and not erratically.

For the practical application, the visual adjustment for all grid points respectively windows are costly. Therefore, according to the invention, it is recommended as alternative to automate the adjustment with the help of a ceramic technology. For this purpose, the picture of the mask 6 will be scanned with a camera, which will take the entire picture. The camera must be equipped with the help of suitable optical filters taking into consideration the spectral sensitivity of the picture sensor, so that its effective spectral sensitivity is adapted to the relative spectral luminosity $V\lambda$ of the observer. Then with an image processing in the camera picture, the areas of each window of the mask are selected with upper and lower segment and the signals averaged therein will be formed. The absolute size of the signals through the screen is unreliable because of the optical display and the optical homogeneity of the picture sensor. To ascertain the brightness profile, however, only the signals relative to the original color are necessary. Therefore it will be automated in a control loop of the respective brightness value behind each window of the screen controlled through the software so that the signals detected through the measuring camera for the upper and lower half of the window are of the same size, that is, that their difference disappears. Then the absolute signal values no longer play a role. The thus found brightness values for the control of the screen will be stored and interpolated for further applications.

The light distribution used to illuminate the original colors, also hits the surface of the screen. Thus, a fraction of the impinging light will then in addition to the color values $X_p$, $Y_p$ and $Z_p$ of the reproduction be reflected in the direction of the observer. In order to compensate this invention, the reflected fraction on the screen will be measured radiometrically and reflected color values, $X_r$, $Y_r$ and $Z_r$ will be calculated therefrom. For a reproduction of a color value $X_p$, $Y_p$ and $Z_p$, these fractions will then initially be subtracted and only the difference $X_r-X_p$, $Y_r-Y_p$ and $Z_r-Z_p$ will be reproduced as color on the screen. The observer then can add up the fraction reflected on the screen surface physically to the reproduced fraction of the screen and arrives at a total of the desired values of the original color. Of course, in this process to calculate the values $X_r$, $Y_r$ and $Z_r$, the measured brightness profile must be taken into account.

Alternatively to the above described method to take into account scattered light, the screen calibration may also be executed directly while the lighting and/or external light is turned on and thus a screen profile is created, which contains the light fraction reflected on the surface. However, in this process attention must be paid that the brightness of the lighting corresponds to the final required value of the colors produced.

The fractions of the light reflected on the screen surface reduce the effective picture contrast, because the minimal color values on the screen surface correspond then at least to the reflected light fraction. Therefore, for the application of the invention attention must be paid that a screen with low surface reflection is used.

Screens suitable for use in the lighting geometry recommended here have reflection values in the range of 0.5 through 0.6%, that is, picture contrasts of nearly 200 are still possible, which is sufficient for a very good picture reproduction.

The advantages of the method of the invention and of the device of the invention are that now the original color sensors can be compared directly with the electronically reproduced sensors and the safety lies in the fact that the colors can be reproduced true to the original. Instead of individual sensors, of course, also entire color pictures can be reproduced and compared with the invention and an exact color uniformity will be achieved, if the color values in the picture are taken spectral and thus can be taken into account for the light source LI used for the reproduction with its spectral distribution in exact conformity with the formula in G1.1. Thus the invention represented here is suitable in particular for the reproduction and comparison of multi-spectrally taken pictures, because they provide the spectral information for each pixel.

The observation surface 4 with screen 2 arranged in box 1 in FIG. 3 is in the upper area relatively close to the light source LI and in the lower area relatively remote from the light source. This creates differences in the illuminance at the upper and lower edge of the screen. A human observer can visually very sensitively differentiate the brightness of directly bordering color surfaces, however, differences in brightness across larger distances are only very insensitively perceptible, because the visual system perceives the perceived brightness according to a course following the third root of physical intensity. Therefore, differences in brightness in the area of 10% across the screen are barely perceivable. Larger differences on the other hand appear disturbing.

In order to reduce the differences of illuminance on the observation surface 4 to an imperceptible degree, it is recommended in another embodiment of the invention to position masks near the light sources in the light beam path, with which a localized, partial shading of the illumination can be accomplished. So that the masks do not affect the spectral light distribution through their spectral transmission, it is recommended to use mechanical masks with certain profiles that locally either totally block or let path through the light fractions.

Figure 5A:
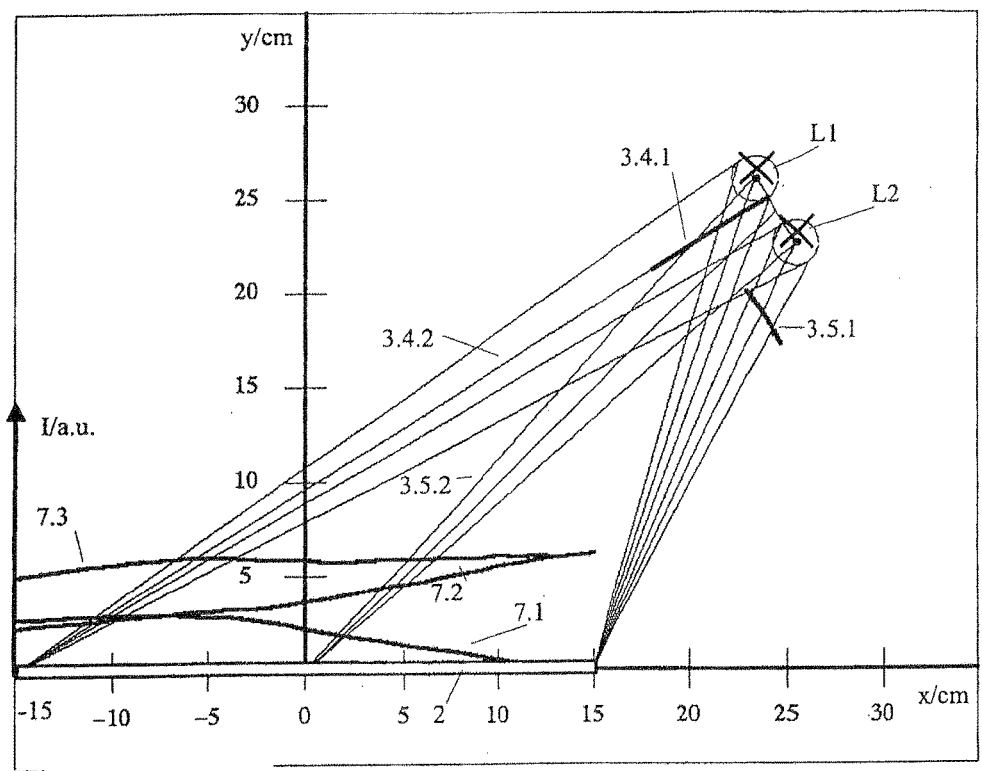

A typical inventive embodiment is outlined in FIG. 5a. It represents a section through the surface of screen 2 in horizontal position. The measurement of x and y coordinates corresponds with −15 to the lower picture edge and with +15 to the upper picture edge. Moreover, as lighting example in the x/y coordination system two closely positioned fluorescent tubes LI and L2 are outlined in their cross section. In front of the fluorescent tubes two light masks 3.4.1 and 3.5.1 are arranged, that have a profile corresponding to the rectangular longitudinal section outlined in FIGS. 5b and 5c.

The light masks 3.4.1 and 3.5.1 are positioned so that all light fractions 3.4.2 and 3.5.2 of both fluorescent tubes still reach unhindered the lower picture edge in position −15. For angles of the light beams in direction to the center of the picture at a measurement 0/0, respectively the upper picture edge +15, the light fractions are increasing shaded. Thus, for the light of the fluorescent tube LI a course of illuminance 7.1 is created, which is applied perpendicularly in the direction of illuminance I additionally outlined left as abscissa and horizontally across the cross section of the screen and reaches a value 0 at the upper picture edge. The corresponding course through the fluorescent tube L2 is represented in 7.2. As a result of the combined effect of short distance to the light source and the calculated shading through mask 3.5.1, the illuminance still increases to the upper picture edge at +15. Both illumination curves result in gradient 7.3, which at the lower picture edge shows a decline of only 10%, overall, however, leads to an extensive uniform course of the illuminance. Through a change of the mask profile, the described distribution of the illuminance can vary in wider borderlines and be adjusted to practical conditions without disturbing the spectral distribution of the light fractions.

When applying the invention in an observation box, it should be taken into account that also interior light from the illuminated environment of the work place can strike onto the observation surface of the screen. Trials have shown that for a typical office environment having a screen brightness in the order of magnitude of 200 cd/m$^2$, the brightening-up of the original color in the screen area caused by ambient light from the environment for the lightest picture area is somewhere around 5 to 7%.

For light fractions from the exterior in this order of magnitude, it is recommended according to the invention, to measure the interior light fractions spectral and in their local distribution and incorporate same in the reproduction of the color. According to the invention this process is the same was described above for the calculation of colors under the main light source. The spectral distribution of the incident light must be measured initially with a radiometer. Presently, radiometers are still relatively costly and expensive. However, in the long run, provisions should be made to install a radiometer in the front region of the observation box and thus continually measure the spectral distribution of incident exterior light.

In addition to the spectral distribution, also the calculation of the brightness profile from interior light on the screen surface should be ascertained. For that purpose, the internal light source of the observation box will be shut off and the technology with test masks according to FIGS. 4a and 4b will be executed in the same way as above described for the internal light source. The color values of the original color in the window of the mask will then be calculated for the spectral distribution of the exterior light. The reproduced color values $X_{P,F}$, $Y_{P,F}$ and $Z_{P,F}$ will be determined with the ascertained brightness profile of the exterior light. In doing so, the reflection of the exterior light on the screen surface will be again taken into account. If subsequent thereto the calculated values will be reproduced on the screen, the original colors appear identical with the reproduced colors.

The reproduction with turned-on internal lightning 3 then makes use of the superposition principle, provided that the screen profile provides a corresponding linearization of the representation of the color values, that is, the color values $X_P+X_{P,F}$, $Y_P+Y_{P,F}$ and $Z_P+Z_{P/F}$ are represented on the screen.

The above described method of the invention to reproduce color has already been successfully realized in a lab model and allows a reproduction true to the original, as long as no stronger exterior light fractions incident directly perpendicularly on the screen surface and cause glossy effects. Hence, as always, attention must be paid to avoid glossy effects from exterior light from the environment of the work place.

Figure 6:
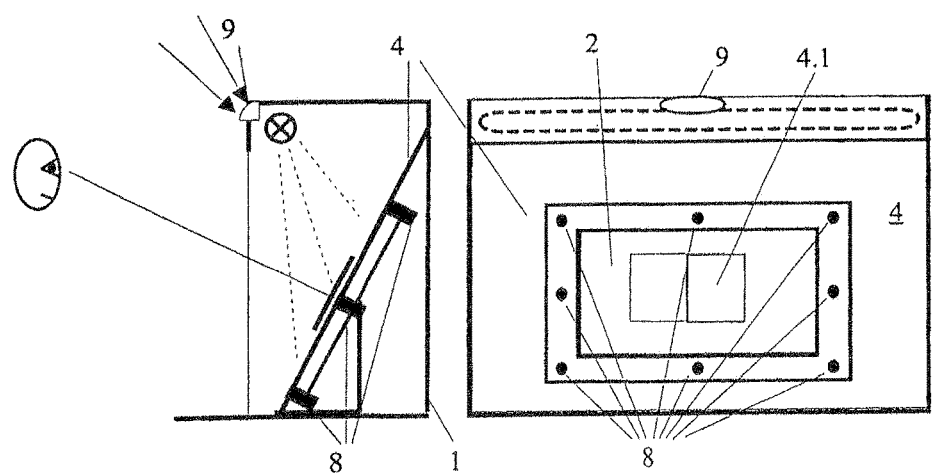

In order to make it more flexible to take into account exterior light, it is recommended according to the invention in the area around the screen to arrange in the observation surface light sensors having a spectral sensitivity according to the brightness sensitivity V$\lambda$ of the human visual system. Such sensors are commercially available. A possible arrangement of such sensors is outlined in FIG. 6, showing observation box 1 with screen 2, observation surface 4 and color sensor 4.1. As example, eight sensors 8 are drawn around the screen. Thus, the brightness distribution and in particular the decline from the lower picture edge to the upper picture edge can be roughly estimated. It is recommended in general to readjust a brightness profile initially exactly ascertained for an external light to the measured value, for example by mathematically adapting the edge parameters of the profile by globally bending the profile, if the external light changes. Because the sensors are on the same plane, on which also color sensors are applied during the operation of the work place, recalibration should be automatically performed using the signals of sensors 8, for example, at the beginning of a work phase or after indication on a monitor of a control computer. The observation surface must be kept free during recalibration.

In FIG. 6 there is also outlined a possible position 9 for the spectral measurement of external light with tightly installed radiometer, which are continually ascertaining the spectral distribution of the external light and are entering the calculation.

In addition, it may also be provided that the brightness of the internal light source is being stabilized through light sensors that are arranged in the upper area of the box so that they do not receive any external light.

Alternatively, it is also recommended to realize the entire illumination of the screen only through a fixed interior lighting, for example, as ceiling light in a room, meaning to no longer use a box. Accordingly, the method of the color reproduction may be used by measuring the spectral distribution and brightness of the illumination at the location of the screen. In this instant preferably the ceiling light should then strike the picture surface at about 45 degrees and glossy effects from light fractions in the vicinity of the direction perpendicular to the screen must be avoided. However, this solution requires timewise constant illumination in a closed room. Changes in brightness from colors that can be reproduced on the screen are limited through the maximum picture brightness. Thus, the high brightness of natural sunlight and light coming in through a window can be reproduced, at least with picture technology available in the long run.

As was already mentioned in the introduction, a color reproduction exactly matching an original color can be accomplished only, if the actually effective basic color-matching curves of the observer are used in the calculation.

The same depend on the individual characteristics of the observer, e.g., his age, but they also change systematically with the angle of the observer as opening angle ω, under which a color surface is observed. Because at present simple measuring methods for the determination of basic color-matching curves of a human observer are not available yet, the basic characteristics of an observer can be taken into account only by selecting basic color-matching values, for which the best results will be achieved. It is known that basic color-matching curves, such as for example, measured by Judd 1951 or Stiles 1959 [3] deliver better visual results for many observers than the standard color-matching curves.

However, the dependence on the observer angle effective during observation has been described through models [4]. A change in the basic color-matching curve with the observation angle can be calculated with these models. Another embodiment of the invention is recommended: to use with the observation angle ω of a color surface, variable color-matching curves for color reproduction at the softproof work place. The color-matching curves required therefor as function of the observer angle ω for a selected observe i, can be calculated mathematically as model for each. Appropriate for the practical application is a factory calculation in steps of angles with which the functions only change marginally, such as in steps of one degree.

Figure 7:
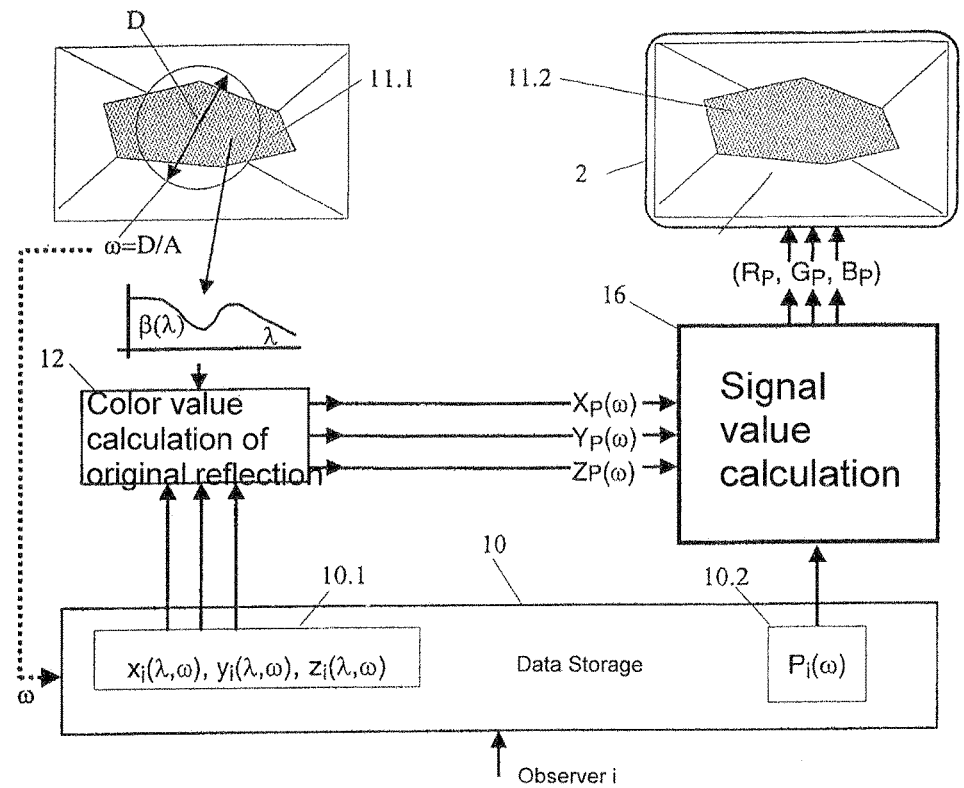

FIG. 7 shows as sample how variable color-matching curves can be used according to the invention in the picture reproduction. It is assumed that the color-matching curves $xi(\lambda, \omega)$, $yi(\lambda, \omega)$ and $zi(\lambda, \omega)$ for various observers i and in steps graduated observer angles .omega, are stored in a data bank 10. For a reproduction, an observer i must be selected. The selection of an observer angle ω valid for a color surface can be derived from the information of the picture to be represented. For that purpose, the picture will be segmented in areas with almost same color. For such an area 11.1 a mean variable is determined, e.g. from a surface area, which is then allocated to a mean diameter D of the color surface. Which will be converted (not shown here) with the distance A of the observer i from the screen into the observer angle of almost ω=D/A. With the observer angle ω—graduated in steps—a set of color-matching curves will then be retrieved from the data bank. With spectrum $\beta(\lambda)$ of the pixels of the color surface, which was for example measured with a multi-spectral color recording, the color value to be reproduced on the screen can then be calculated for each pixel, while, as already described above, the calculation methods of the invention, taking into account internal light sources and external light as well as brightness profile and light reflection on the screen surface, will be included in the calculation of the color value 12. The color values $X_p(\omega)$, $Y_p(\omega)$ and $Z_p(\omega)$ calculated for each pixel will be reproduced on the screen via an observer-specific screen profile $Pi(\omega)$, in that in the calculation of signal value 16 via the screen profile $Pi(\omega)$ the control signals $R_p$, $G_p$, and $B_p$ of screen 2 will be calculated for a color and above that, color picture 11.2 can be reproduced on screen 2.

With respect to this reproduction it must be observed that also the calibration of the screen, that is, the so-called screen profile, always depends on the selected observer and its basic color-matching values must be compiled again. The screen profile describes the connection between RGB signals used to control the color at the entrance of the screen and color values derived therefrom on the screen surface, e.g. in X, Y, Z. This connection will be ascertained metrologically and can by analytically described with a model or a table of support points (=backward model).

For the application to reproduce color, a so-called inverted model must be ascertained from this model, which inverted model allocates to the given color values to be reproduced the necessary RGB signals at the entrance. Such an inverted model (=forward model) is precalculated from the backwards model calculated analytical or through support points either through analytical inversion or through search methods and interpolation methods from the support model and stored as screen profile. This basic method to create such a screen profile is known, however, today only screen profiles are created based on a standard observer according to CIE and all available software methods for the "Color Management" of screens are only designed for same. For deviating observers no measuring technique is available to measure direct color values on the screen surface, because also all measuring devices for the measuring of color values for standardized standard observers are designed according to CIE and 2 or 10 degrees, and respective color values differ therefrom for deviating observer. To create screen profiles for deviating observers, a full spectral measurement of the screen colors is required.

Figure 8:
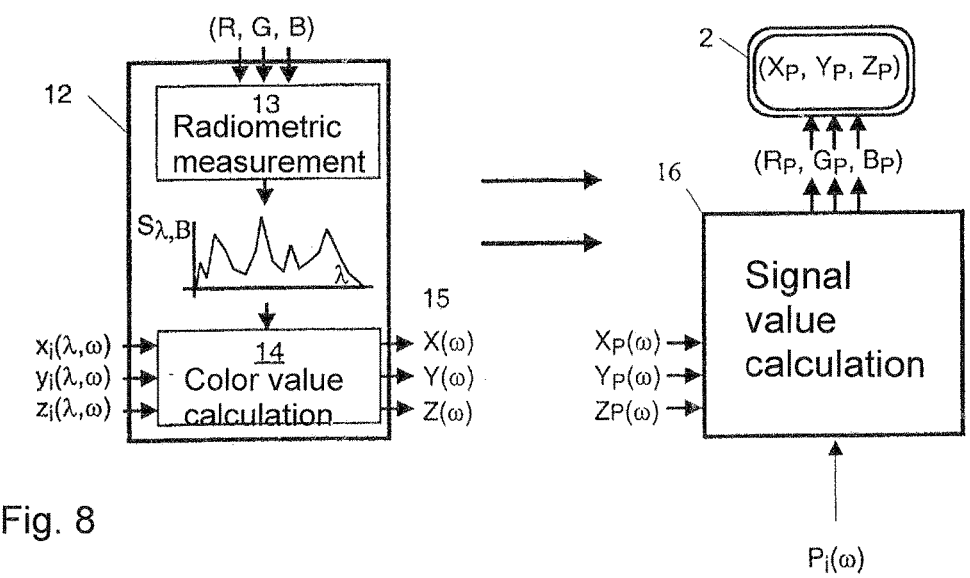

The method to create a screen profile $Pi(\omega)$ for any observer i dependent on the observer angle ω is outlined as example in FIG. 8. First of all, the method of the measuring technique and the determination of color values 15 on the screen are described. For a sufficiently large number of support points, the spectra SA, B of screen colors for any input signals R, G, B of the screen are measured with a spectroradiometer 13. With the basic color-matching curves selected from a data bank 10 in FIG. 7 of a selected observer $xi(\lambda, \omega)$, $yi(\lambda, \omega)$, $zi(\lambda, \omega)$, color values 15 with $X(\omega)$, $Y(\omega)$, $Z(\omega)$ are calculated therefrom. From the totality of all color values in dependence on the input signal, a mathematical backward model 12 is created as analytical model or interpolatable support grade. This is then mathematically inverted and within the application of the present invention stored in the data bank 10 in FIG. 8. Through this model, screen profiles $xi(\lambda, \omega)$, $yi(\lambda, \omega)$, $zi(\lambda, \omega)$, $Pi(\lambda, \omega)$ can then be retrieved for each selected observer i and as function of its observer angle ω screen profiles $xi(\lambda, \omega)$, $yi(\lambda, \omega)$, $zi(\lambda, \omega)$, $Pi(\omega)$ from data storage 10.1 and 10.2 (see FIG. 7).

Figure 9:
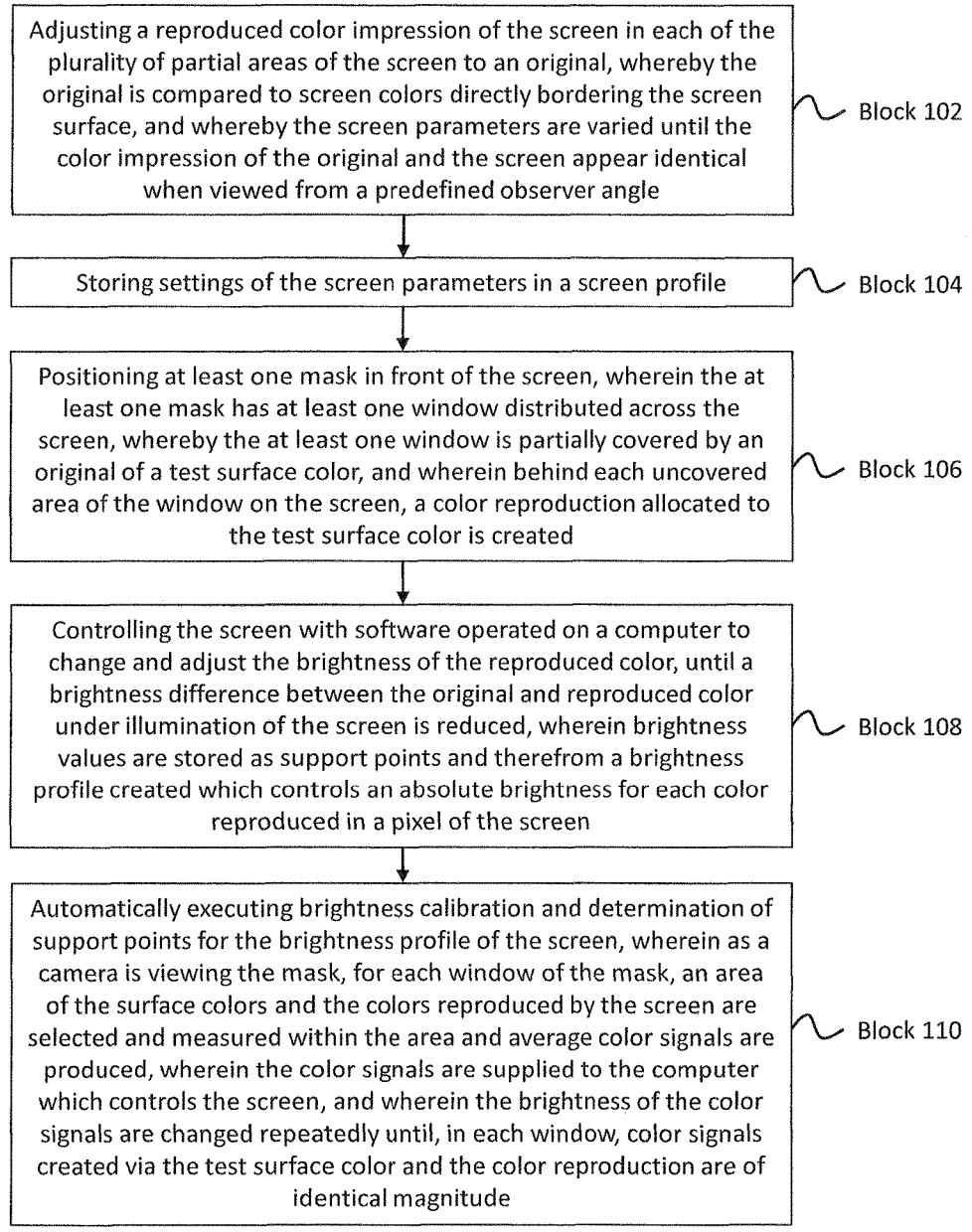

FIG. 9 is a flowchart 100 illustrating a method for the screen calibration for the true-to original reproduction of surface colors, the spectral reflection distribution of which is known, on a screen, which is operated under incident light from at least one light source with angle of incident outside a gloss angle and with known spectral light distribution, whereby the screen is influenced by adjustment of parameters with software and electronic control in each of a plurality of partial areas of the screen, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a reproduced color impression of the screen in each of the plurality of partial areas of the screen is adjusted to an original, whereby the original is compared to screen colors directly bordering the screen surface, and whereby the screen parameters are varied until the color impression of the original and the screen appear identical when viewed from a predefined observer angle. Settings of the screen parameters are stored in a screen profile (block 104). At least one mask is positioned in front of the screen, wherein the at least one mask has at least one window distributed across the screen, whereby the at least one window is partially covered by an original of a test surface color, and wherein behind each uncovered area of the window on the screen, a color reproduction allocated to the test surface color is created (block 106). The screen is controlled with software operated on a computer to change and adjust the brightness of the reproduced color, until a brightness difference between the original and reproduced color under illumination of the screen is reduced, wherein brightness values are stored as support points and therefrom a brightness profile created which controls an absolute brightness for each color reproduced in a pixel of the screen (block 108). A brightness calibration and determination of support points for the brightness profile of the screen is automatically executed, wherein as a camera is viewing the mask, for each window of the mask, an area of the surface colors and the colors reproduced by the screen are selected and measured within the area and average color signals are produced, wherein the color signals are supplied to the computer which controls the screen, and wherein the brightness of the color signals are changed repeatedly until, in each window, color signals created via the test surface color and the color reproduction are of identical magnitude (block 110).

LIST OF FIGURES

Figure 2:
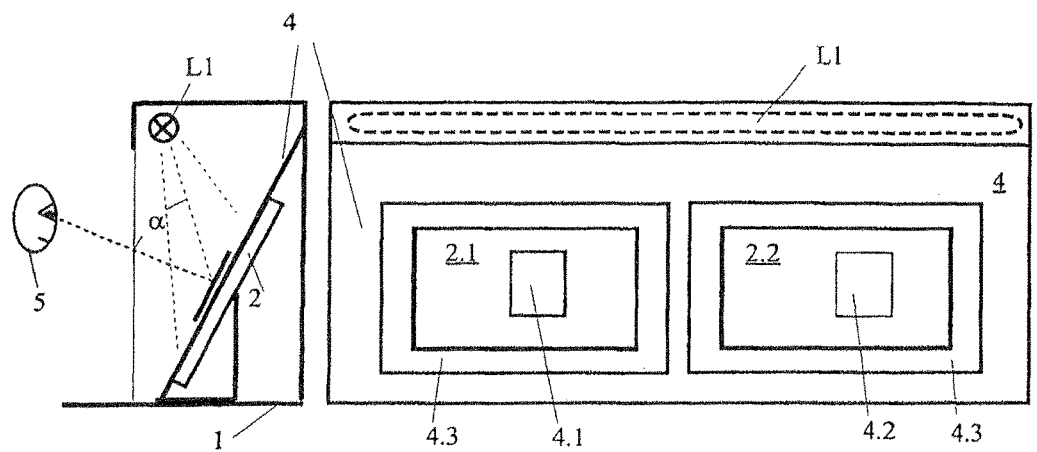
Figure 4B:
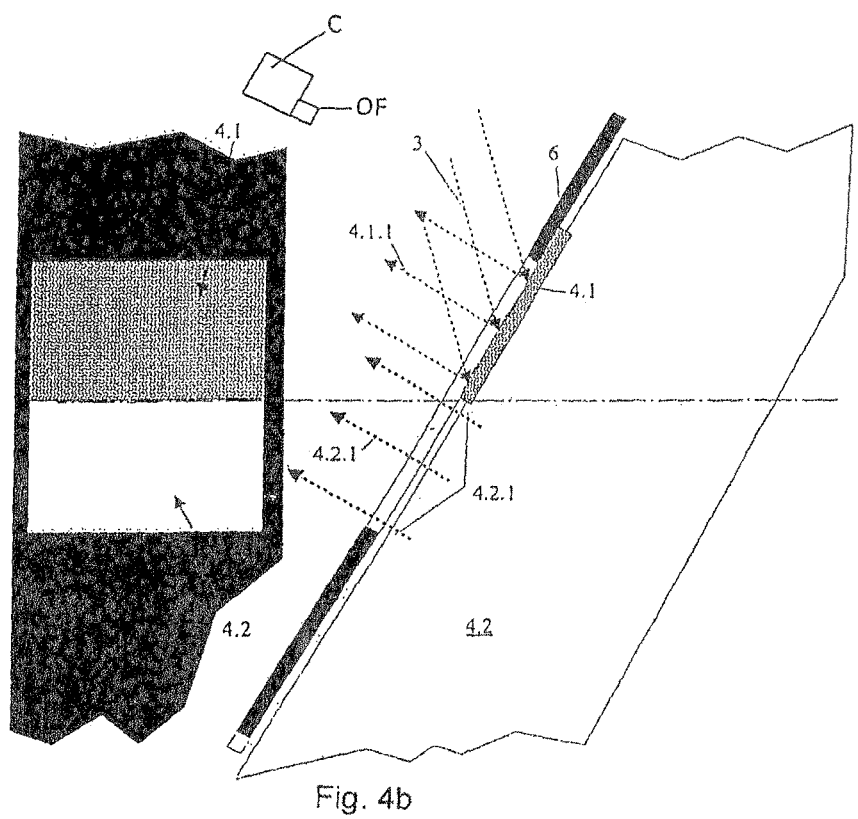
Figure 4A:
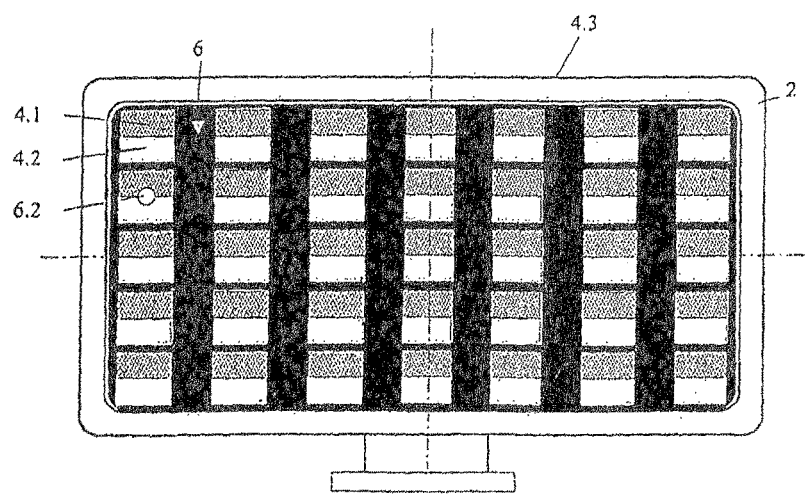
Figure 5B:
Figure 5C:

FIG. 1*a*: Lighting box with adjacent screen for color equalization between mode in the lighting box and reproduction on the screen (State of the Art);

FIG. 1*b*: Lighting box in FIG. 1*a* in cross section and longitudinal section (State of the Art);

FIG. 2: Lighting box with two frames, one for the mode and one for the reproduction, in cross section and longitudinal section (State of the Art);

FIG. 3: Lighting box of the invention with screen;

FIG. 4*a*: Detailed view of an observation mask with original and reproduced color in top view and cross section;

FIG. 4*b*: Screen with observation mask with a multitude of windows distributed across the screen in the observation mask;

FIG. 5*a*: Schematic representation of the lighting situation of a screen with two fluorescent tubes;

FIG. 5*b*: Model light masks in longitudinal section;

FIG. 5*c*: Light mask from FIG. 5*b* in longitudinal section rotated by 90° around longitudinal;

FIG. 6: Lightning box of the invention with screen and light sensor On the screen edge;

FIG. 7: Schematic representation of the true-to-original color reproduction on a screen with variable color-matching curves;

FIG. 8: Schematic representation of the method create a screen profile.

LITERATURE

[1] Mark. D. Fairchild, Color Appearance Models, Addison-Wesley Longman, Inc, Reading Mass., 1998, ISBN 0201-63464-3.

[2] CIE publication 159-2004: A Colour Appearance Model for Colour Management systems: CIECAM02

[3] G. Wyszecki, W. S. Stiles, Color Science: Concepts and Methods, Quantitative Data and Formulae, 2nd. Edition, John Wiley & Sons, New York 1982, Chapt. 5.6

[4] F. Vienot, Report on a fundamental chromaticity with physiologically significant axes, Proc. 9th Congress of the International Colour Association, SPIE Vol 4421 (2202), p. 565-570

LIST OF USED REFERENCE SIGNS AND VARIABLES

1 Observation box
2 Monitor or Screen
2.1 Observation area
2.2 Surface of a screen
3 Illumination or Light
3.1 Direct Incidence of Light
3.2 Indirect Incidence of Light
3.3 Indirect Incidence of Light
3.4.1 Light Mask
3.4.2 Light Fraction
3.5.1 Light Mask
3.5.2 Light Fraction
4 Observation Surface
4.1 Color sensor/Original
4.1.1 Test Color or reflected rays
4.2 Color Reproduction
4.2.1 Light of Reproduction
4.3 Frame
5 Observer
6 Mask
6.2 Window
7.1 Light intensity of Lamp L1 on the Screen
7.2 Light intensity of Lamp L2 on the Screen
7.3 Light intensity of L1 and L2 on the Screen
8 Light Sensor
9 Position for spectral measurement of external light
10 Data bank
10.1 User-specific color-matching curves
10.2 User-specific screen profile
11.1 Color areas of original
11.2 Color areas of reproduction
12 Backward Model
13 Radiometric measurement
14 Color-Value Calculation
15 Color Values
16 Signal Value Calculation
A Distance
D Diameter
i Observation Index
I Light intensity
K Standardizing Constant
L1-L3 Lamp
P Scatter Lamp
$Pi/Pi(\omega)$ Screen profile for observer angle $\omega$
R1, R2, R3 Reflectors
$R_p, G_p, B_p$ Control Signals
R, G, B Input signal
$S\lambda$ Spectral Distribution
$S\lambda,_B$ Spectra of the Screen Color
$V\lambda$ Brightness Sensitivity
$x(\lambda), y(\lambda), z(\lambda)$ Color-Matching Curve
$xi(\lambda,\omega), yi(\lambda,\omega), zi(\lambda,\omega)$ Color-Matching Curve X,Y,Z Standard Color Values
Xw,Yw,Zw Color Values for a reference white
Xp, Yp, Zp Color Values to be reproduced
Xr,Yr,Zr Color Values of reflected Fractions
$Xp_{(F)}, Yp_{,F}, Zp_{,F}$ Color Values from External Light Illumination
$Xp(\omega), Y_P(\omega), Zp(\omega)$ Color Values for Observer Angle $\omega$
a Observer Angle to Light Incidence
$\beta(\lambda)$ Spectral Reflection
$\omega$ Observer Angle/Opening Angle of a Color Surface

The invention claimed is:

1. A method for the screen calibration for the true-to-original reproduction of surface colors, the spectral reflection distribution of which is known, on a screen, which is operated under incident light from at least one light source with angle of incident outside a gloss angle and with known spectral light distribution, whereby the screen is influenced by adjustment of parameters with software and electronic control in each of a plurality of partial areas of the screen, the method comprising:
adjusting a reproduced color impression of the screen in each of the plurality of partial areas of the screen to an original color, whereby the original color is compared to screen colors directly bordering the screen surface, and whereby the screen parameters are varied until the color impression of the original color and the screen appear identical when viewed from a predefined observer angle;
storing settings of the screen parameters in a screen profile;
positioning at least one mask in front of the screen, wherein the at least one mask has at least one window distributed across the screen, whereby the at least one window is partially covered by an original color of a test surface color, and wherein behind each uncovered area of the window on the screen, a color reproduction allocated to the test surface color is created;
controlling the screen with software operated on a computer to change and adjust the brightness of the reproduced color, until a brightness difference between the original color and reproduced color under illumination of the screen is reduced, wherein brightness values are stored as support points and therefrom a brightness profile created which controls an absolute brightness for each color reproduced in a pixel of the screen; and
automatically executing brightness calibration and determination of support points for the brightness profile of the screen, wherein as a camera is viewing the mask, for each window of the mask, an area of the surface colors and the colors reproduced by the screen are selected and measured within the area and average color signals are produced, wherein the color signals are supplied to the computer which controls the screen, and wherein the brightness of the color signals are changed repeatedly until, in each window, color signals created via the test surface color and the color reproduction are of identical magnitude.

2. The method according to claim 1, wherein the parameters are varied until the color impression of the original and the screen appear identical when viewed from the predefined observer angle by a standard observer in accordance with CIE 1964-10 degree or CIE 9131-2 degree.

3. The method according to claim 1, wherein the camera is equipped with an optical filter, which together with a spectral sensitivity of the camera, results in a total spectral profile of the picture taken, which corresponds to a spectral brightness (V2) of a standard observer.

4. The method according to claim 1, wherein color stimuli as a result of a reflection of the light at the screen surface in a direction of a location is measured in their spectral distribution and their intensity, wherein the color stimuli are described for a standard observer as reflected color values of the screen and differences of color values of the original colors and the reflected color value are reproduced on the screen.

5. The method according to claim 1, wherein color stimuli resulting from reflection of the light at the screen surface in a direction of a position is measured during measurement of the screen profile during turned on lighting and then are contained in an optionally stored screen profile.

6. The method according to claim 1, wherein the screen is positioned in a box, a horizontal screen center is illuminated in the screen center in a vertical section under 45 degrees, wherein the illumination is executed through extended rod-shaped light sources that are mounted above and/or below the screen, and a homogenization of the lighting distribution on the screen is achieved whereby the masks are mounted in a ray path of the light from the light sources to the screen, which as a result of their configuration, block or let pass fractions of the light rays from the light sources on the way to the screen depending on location and/or angle.

7. The method according to claim 1, wherein illumination in a room environment is generated from the ceiling and the light sources are positioned so that light strikes the screen under a 45 degree angle.

8. The method according to claim 1, wherein spectral distribution of the lighting is measured by a spectrometer mounted directly on the screen and results of the spectral light distribution are taken into account when preparing the screen profile.

9. The method according to claim 1, wherein the screen is operated under an internal light source in a box and additionally external light falling on an observation surface with the same or other spectral distribution is included in calculating the reproduction of the color, and at the same time, the color distribution separated from light coming from the outside and light from the internal light source is ascertained and the color reproduction is represented as total of color values resulting from the internal and external illumination.

10. The method according to claim 9, wherein brightness distribution of the light impinging from the outside is measured during turned-off light source via sensors that are distributed through the box.

11. The method according to claim 1, further comprising using variable basic color-matching curves for calculating colors from the spectral reflection properties of original colors and for calculating color reproduction via the screen in an order of magnitude of a color and an observation angle derived therefrom, and wherein a color display in areas of almost the same colors are segmented and an allocated observer angle for a segment is determined from as a size proportion of given color represented in a picture.

12. The method according to claim 1, wherein for the color reproduction with different standard observers, a data bank is built in which basic color-matching curves of various observers are stored, further comprising using the basic color-matching curves as a function of an observer angle, wherein color values of original colors are created from their spectral reflection from the variable basic color-matching curves, wherein colors displayed on the screen resulting from their spectral distribution are described and color values are calculated for building screen profiles dependent on different observer angles, wherein the screen profiles are stored in real time processing for color reproduction of pictures or as precalculated profiles in a data bank and retrieved subject to a selected observer angle.

* * * * *